(12) United States Patent  
Barbastathis et al.

(10) Patent No.: US 6,621,633 B2
(45) Date of Patent: Sep. 16, 2003

(54) SYSTEM AND METHOD FOR INCREASING THE DIFFRACTION EFFICIENCY OF HOLOGRAMS

(75) Inventors: George Barbastathis, Boston, MA (US); Arnab Sinha, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/938,249

(22) Filed: Aug. 23, 2001

(65) Prior Publication Data

US 2003/0053213 A1 Mar. 20, 2003

(51) Int. Cl.⁷ .............................................. G02B 27/00
(52) U.S. Cl. ....................... 359/577; 359/578; 356/454; 385/37
(58) Field of Search ................................ 359/280, 578, 359/577; 356/454; 385/37; 430/2

(56) References Cited

U.S. PATENT DOCUMENTS

| 3,763,441 A | | 10/1973 | Roess |
| 4,752,130 A | | 6/1988 | George et al. |
| 5,970,190 A | * | 10/1999 | Fu et al. ......................... 385/37 |
| 6,320,886 B1 | * | 11/2001 | Dawber et al. ................ 372/22 |
| 2002/0005766 A1 | * | 1/2002 | Abbas et al. .............. 333/99 S |
| 2002/0045104 A1 | * | 4/2002 | Efimov et al. .................. 430/2 |

FOREIGN PATENT DOCUMENTS

DE 2143829 3/1973

OTHER PUBLICATIONS

"Enhanced Optooptical Light Deflection Using Cavity Resonance," Steier et al. *Optical Society of America: Applied Optics.* Apr. 15, 1988. vol. 27, No. 8.

"Optical Holographic Interconnects: Categorization and Potential Efficient Passive Resonated Holograms," Collins Jr. et al. *Optical Society of America.* Oct. 1989. vol. 6, No. 10.

* cited by examiner

*Primary Examiner*—John Juba
*Assistant Examiner*—Fayez Assaf
(74) *Attorney, Agent, or Firm*—Samuels, Gauthier & Stevens, LLP

(57) ABSTRACT

A resonator system is disclosed for use in illuminating an input to a diffractive element. The system includes a source of an electromagnetic field having a wavelength of $\lambda$, and first and second optical elements, each of which is at least partially reflecting. The first and second optical elements are separated from one another such that the optical path between the optical elements has a distance $$(2m+1)\frac{\lambda}{4},$$

wherein m is an integer.

18 Claims, 5 Drawing Sheets

US 6,621,633 B2

SYSTEM AND METHOD FOR INCREASING THE DIFFRACTION EFFICIENCY OF HOLOGRAMS

This invention was developed with support from the United States Air Force Research Laboratory under contract F08630-00-1-0012. The United States government has certain rights to this invention.

BACKGROUND OF THE INVENTION

The invention generally relates to holography, and particularly relates to the readout of holograms with improved diffraction efficiency by using a resonant system in the path of the reference beam of the hologram.

Holograms are typically recorded as a result of interference between two mutually coherent light beams, the signal beam and the reference beam. The signal beam carries the information, typically in the form of amplitude modulation imprinted on the wavefront. The reference beam interferes with the signal beam creating an interference pattern that is then recorded in photosensitive material. In the simplest case, the reference is a plane wave. On reproducing the reference beam originally used to record the hologram, one is able to reproduce the signal beam as a result of diffraction from the previously recorded interference pattern.

It is known that multiple holograms may be superimposed or multiplexed in volume media. Individual holograms may be accessed selectively in a way similar to the individual detection of multiple periodicities in crystal lattices using Bragg diffraction. The Bragg selectivity property of volume holograms forms the basis of most of the current applications of volume holograms. These include volume holographic memories, in which several holograms are multiplexed so as to yield high storage capacities, opto-electronic interconnections for telecommunications and artificial neural networks, and four dimensional (spatial and spectral) imaging.

The light efficiency of a hologram is measured by a unitless quantity called the diffraction efficiency η, defined as the ratio of the diffraction power divided by the incident power. If the diffraction efficiency is low, then the aforementioned applications are limited by various factors including signal to noise ratio considerations. For example, although photorefractive crystals are rewritable, they typically yield low diffraction efficiencies before non-linear effects set in to affect the recording process. The maximum achievable η depends on the holographic materials, but conventional holographic materials having high diffraction efficiency are not typically suitable for certain applications. For example, photopolymers afford high diffraction efficiencies, but are difficult to maintain and control, and may exhibit material shrinkage. Photorefractive polymers afford high diffractive efficiencies, but are inconvenient to use since they require voltages in the order of MV/cm during the recording process. This requirement limits the useful hologram thickness (and thereby the information capacity) in practical applications. These holograms also violate the Born approximation and their behavior is qualitatively different from that of weak holograms. For example, they typically exhibit increased crosstalk between Bragg-multiplexed holograms due to re-diffraction among multiple Born orders.

A principle constraint in the practical realization of most applications of volume holograms, therefore, is that the diffraction efficiency yielded by currently available holographic recording media suitable for volume holography is very low. The diffracted beams obtained from these volume holograms are relatively weak thus rendering them unsuitable for many applications.

There is a need, therefore, for a system and method of improving the diffraction efficiency of holograms, and in particular volume holograms.

SUMMARY OF THE INVENTION

The invention provides a resonator system for use in illuminating the input to a diffractive element. The system includes a source of an electromagnetic field having a wavelength of λ, and first and second optical elements, each of which is at least partially reflecting. The first and second optical elements are separated from one another such that the optical path between the optical elements has a distance $$(2m+1)\frac{\lambda}{4},$$

wherein m is an arbitrary integer. In certain embodiments, the diffractive element is a hologram, and the first and second optical elements are mirrors.

BRIEF DESCRIPTION OF THE DRAWINGS

The following description may be further understood when with reference to the accompanying drawings in which:

FIGS. 5 and 6 show diagrammatic schematic illustrations of another system in accordance with a further embodiment of the invention an illustrative view of.

The drawings are shown for illustrative purposes and are not to scale.

DETAILED DESCRIPTION OF THE INVENTION

Figure 1:
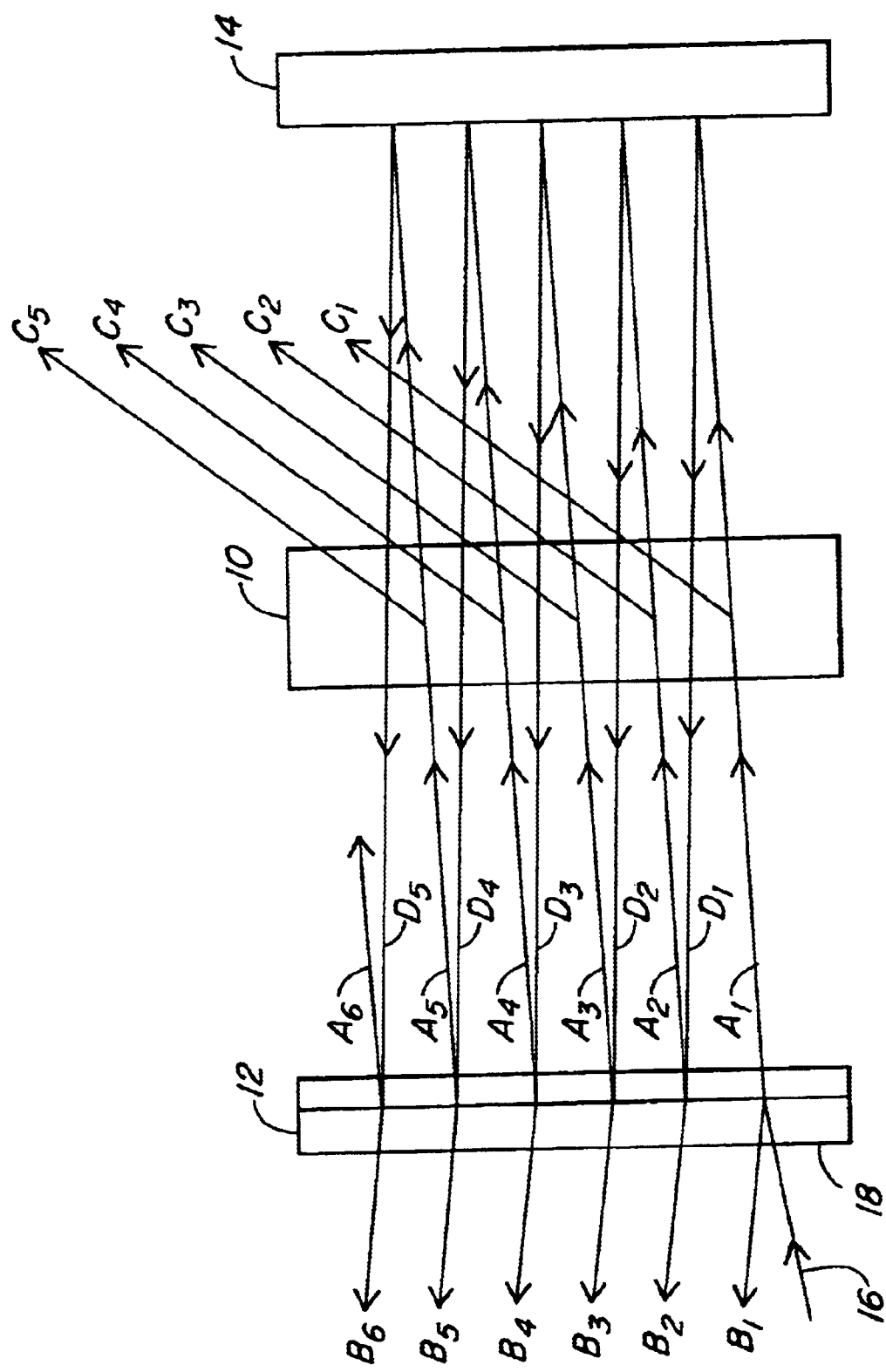
FIG. 1 shows a diagrammatic schematic illustration of a system in accordance with an embodiment of the invention.

As shown in FIG. 1, a system in accordance with an embodiment of the invention includes a resonant structure in which a conventional weakly diffracting volume hologram 10 may be positioned. The resonator consists of a partially reflecting mirror 12 and a perfectly reflecting mirror 14. The resonator ensures that all incident light undergoes multiple passes through the volume hologram with a certain amount of light being diffracted out at each pass. By adjusting the length of the resonator, the light that is diffracted out at each pass may be ensured to be in phase. Simultaneously, the backward-propagating (or reflected) fields add destructively, ensuring that all incident power is channeled in the direction of the diffracted beam.

In particular, incident light into the resonator enters from as indicated at 16 at an angle that is oblique with respect to the front surface 18 of the mirror 12. The incident light is directed through the volume hologram 10 producing a diffracted field having an amplitude of $C_1$ as shown in FIG.

1. The forward propagating field (having an amplitude of $A_1$) that travels through the resonator in the forward direction is fully reflected by the mirror 14, and the return propagating field (having an amplitude of $D_1$), is partially reflected by the mirror 12. The field that is refracted through the mirror 12 has amplitude of $B_1$, and the amplitude of the field that is again reflected in the forward direction is $A_2$. The hologram is formed by the summation of all of the diffracted fields $C_1+C_2+C_3$ etc.

The conditions for resonance may be derived by first identifying certain variables and relationships. The optical path within the resonator may be denoted as l, and the natural diffraction efficiency of the hologram (when not in a resonator) may be denoted as $\eta$. The amplitude reflection coefficient of the mirror 12 in the forward direction may be denoted as r, and the amplitude reflection coefficient of the mirror 12 in the backward direction may be denoted as r'. The corresponding amplitude transmission coefficients of mirror 12 in the forward and backward directions are denoted as t and t'. It is known that $r^2+tt'=1$ and $r=-r'$.

The amplitude of the beam incident of the front face of mirror 12 as indicated at 16 may be set to 1 without compromising the generality of the following analysis. The values $A_j$, $B_j$, $C_j$, and $D_j$ denote the amplitude of the $j^{th}$ order forward propagating, refracted, diffracted and return propagating fields respectively, where j=1, 2, 3 . . . .. The value $B_1=r$, and the values $A_j$, $B_{j+1}$, $C_j$, and $D_j$ are calculated as follows:

$$A_j = t(r'\sqrt{(1-\eta)})^{j-1} e^{2i(j-1)kl}$$

$$B_{j+1} = tt'\sqrt{(1-\eta)}(r'\sqrt{(1-\eta)})^{j-1} e^{2ijkl}$$

$$C_j = \sqrt{\eta}\, t(r'\sqrt{(1-\eta)})^{j-1} e^{ik(2(j-1)l+d)}$$

$$D_j = t\sqrt{(1-\eta)}(r'\sqrt{(1-\eta)})^{j-1} e^{2ijkl}$$

The total amplitude of the refracted field B may be expressed as:

$$B = r + tt'\sqrt{(1-\eta)}\, e^{2ikl} \sum_{j=1}^{\infty} \left(r'\sqrt{(1-\eta)}\, e^{2ikl}\right)^{j-1}$$

which may be simplified to:

$$B = \frac{r + \sqrt{(1-\eta)}\, e^{i2kl}}{1 + r\sqrt{(1-\eta)}\, e^{i2kl}}$$

The intensity ($I_B$) of the reflected field, therefore, may be expressed as:

$$IB = BB^* = \frac{r^2 + \left(\sqrt{(1-\eta)}\right)^2 + 2r\sqrt{(1-\eta)}\cos(2kl)}{1 + \left(r\sqrt{(1-\eta)}\right)^2 + 2r\sqrt{(1-\eta)}\cos(2kl)}$$

Resonance may be obtained by setting the reflected intensity $I_B$ to zero. The intensity of the reflected forward propagating fields as well as the diffracted fields are thereby maximized.

The conditions for resonance and 100% diffraction efficiency for oblique incidence as shown at 16 in FIG. 1 are given by $r=\sqrt{1-\eta}$ and $$kl = (2m+1)\frac{\pi}{2}$$

where m is an arbitrary integer. Systems involving oblique incidence, therefore, are somewhat limited in that the surface area of the mirrors 12 and 14 may not be infinitely large to accommodate the drift distance between each forward propagating field and its associated return propagating field.

Figure 2:
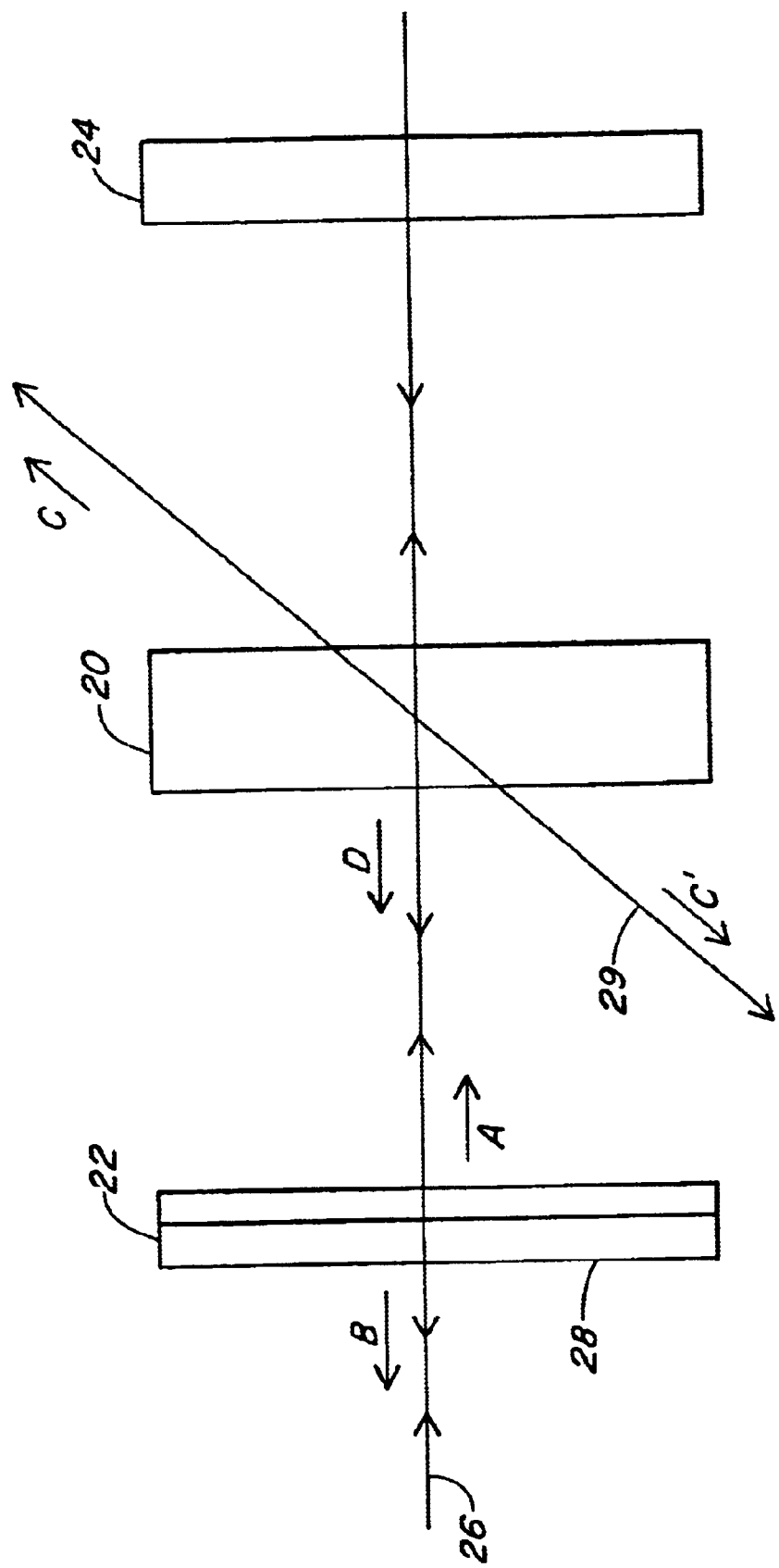
FIG. 2 shows a diagrammatic schematic illustration of a system in accordance with another embodiment of the invention.

As shown in FIG. 2, a system in accordance with another embodiment of the invention involves the use of incident light as indicated at 26 that is directed through a partially reflecting mirror 22 at an angle that is normal to the front surface 28 of the mirror 22. The forward propagating light field travels through a volume hologram 20 producing a diffracted field, and a backward propagating field is reflected by a perfectly reflecting mirror 24 and directed back toward the mirror 22 as discussed above with reference to FIG. 1. The conditions for resonance for the system of FIG. 2 are $r=1-\eta$ and $$kl = (2m+1)\frac{\pi}{2}$$

where m is an arbitrary integer. Because the return propagating field in FIG. 2 is at normal incidence with respect to the return surface of the volume hologram 20, a second phase conjugated diffracted field may be produced as indicated at 29 having an amplitude of C'.

When absorption by the resonator system (including the hologram) is considered, the resonance condition is satisfied by $|r|=1-\eta-b$ and the value $\cos(2kl)=1$ if $r<0$, and $\cos(2kl)=-1$ if $r>0$, where r is the amplitude reflection coefficient of the front partially reflecting mirror, $\eta$ is the diffraction efficiency of the hologram, b is the absorption of the resonator system, and $k=2\pi/\lambda$. This applies if $\eta$ is fixed and r is varying.

If $\eta$ is varying and r is fixed, then $$|r| = 1 - \eta - b = \frac{2|r| - 2|r|b - b}{2 + |r|b}$$

Thus, $$\eta = \frac{(2-b)(1-|r|+|r|b)}{(2+|r|b)}$$

and the value $\cos(2kl)=-1$ if $r>0$, and $\cos(2kl)=1$ if $r<0$.

The use of volume holograms in a resonator of the invention may be more Bragg-selective than volume holograms that are used without a resonator of the invention. Because an incident light field undergoes multiple passes within the resonator, the effective length and Bragg selectivity in resonant architectures are enhanced. If the quality factor of the resonator is denoted by Q, then the improvement in Bragg selectivity may be observed from the following approximation:

$$\Delta\theta_{resonantor} = \frac{\Delta\theta_{hologram}}{Q}$$

Qualitatively, this approximation is derived from the fact that each photon completes on average Q round trips inside the resonator before exiting. The improved selectivity, together with improved diffraction efficiency, provides numerous potential benefits, including improved capacity for holographic memories, improved resolution for holographic imaging, and improved channel separation for holographic communication and interconnection applications.

Figure 3:
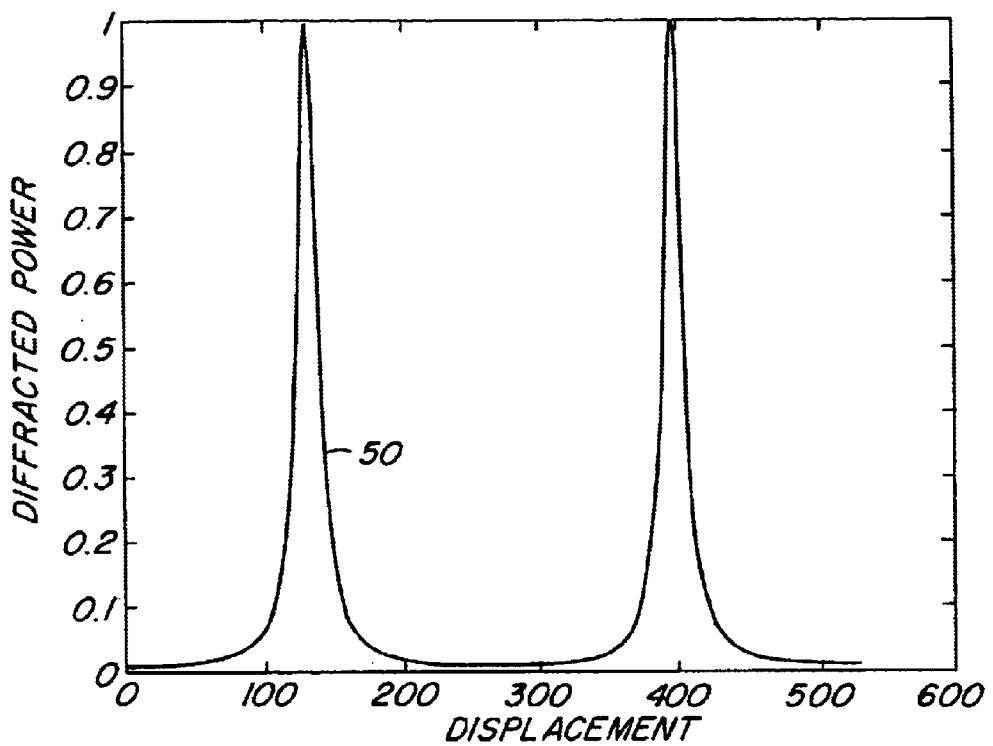
FIG. 3 shows a graphical illustration of variations in the optical path of a resonator verses the diffracted power in a system in accordance with an embodiment of the invention.
Figure 4:
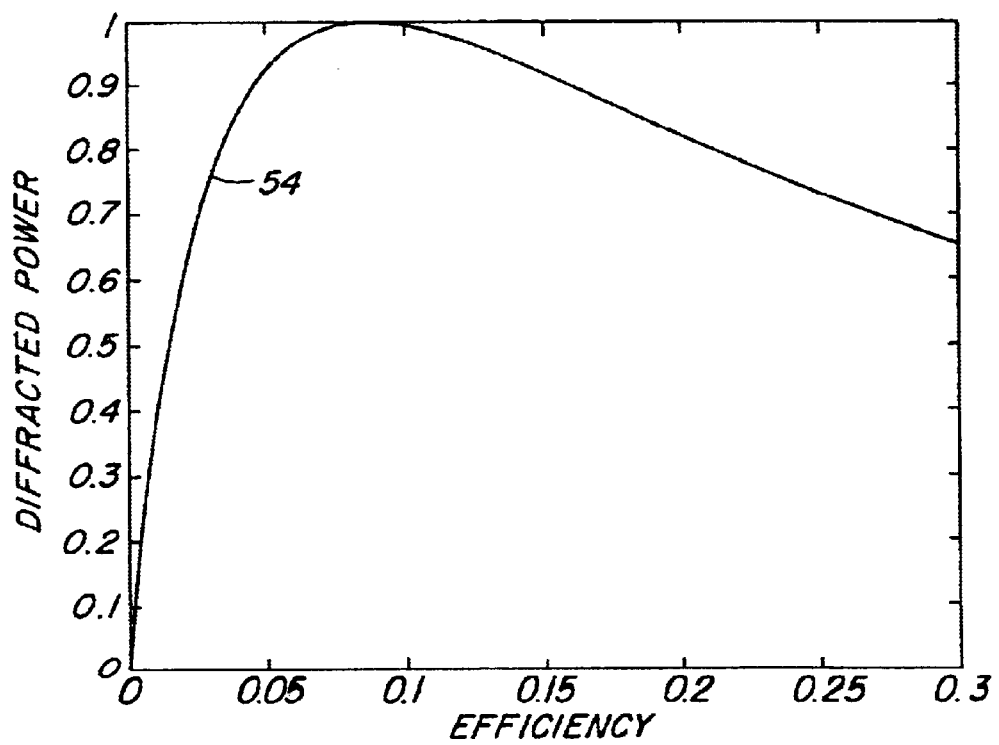
FIG. 4 shows a graphical illustration the optical path of a resonator verses the diffracted power in a system in accordance with an embodiment of the invention.

A specific example of a system as shown in FIG. 2 was constructed with a 90% partially reflecting mirror (intensity reflectivity), and a hologram having an efficiency of 10%. As shown at 50 in FIG. 3, power of the diffracted field is harmonically related to the length l of the optical path in the resonator. The distance between the mirrors, therefore, should be precisely calibrated. As shown at 54 in FIG. 4, the diffracted power may be optimized dependent on the diffraction efficiency of the hologram and the reflectivity of the partially reflecting mirror.

Figure 5:
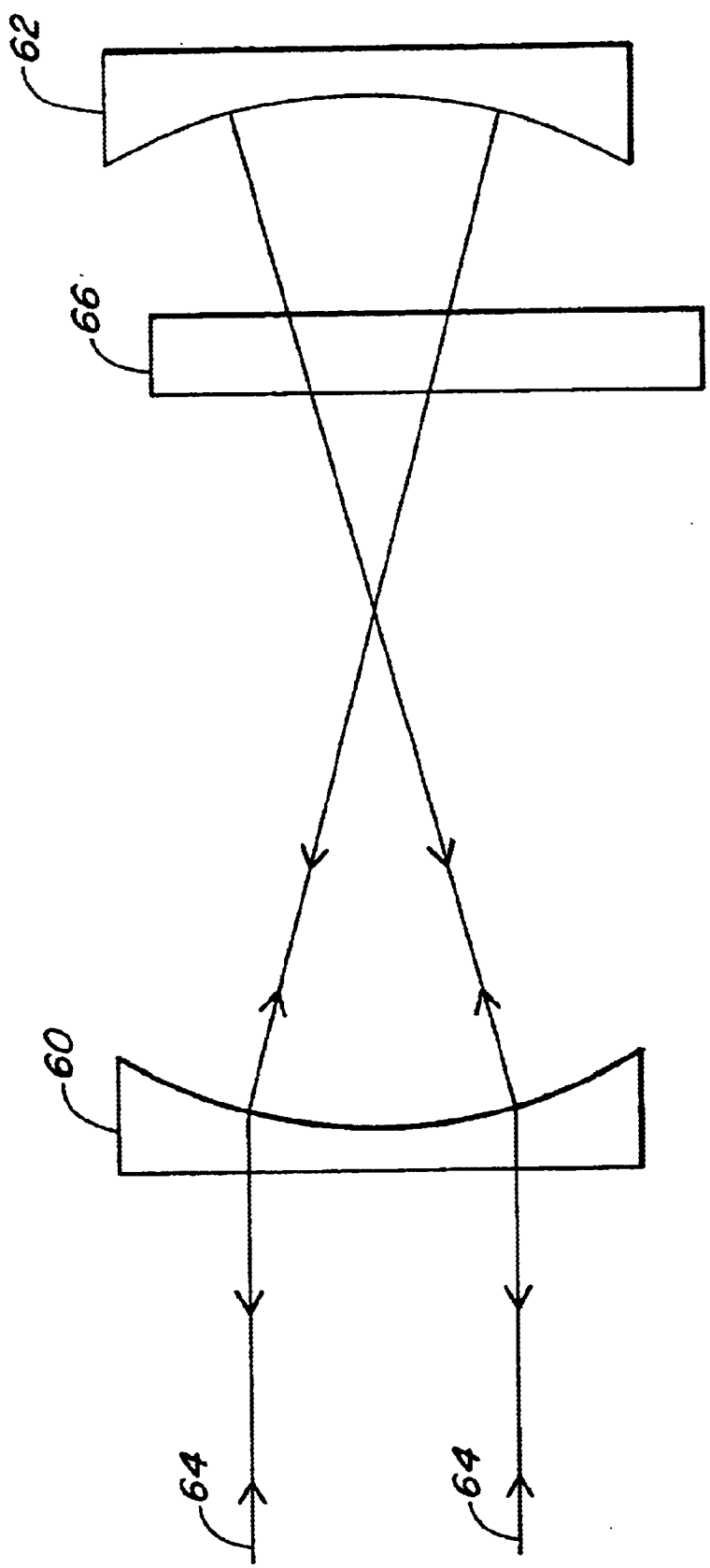
Figure 6:
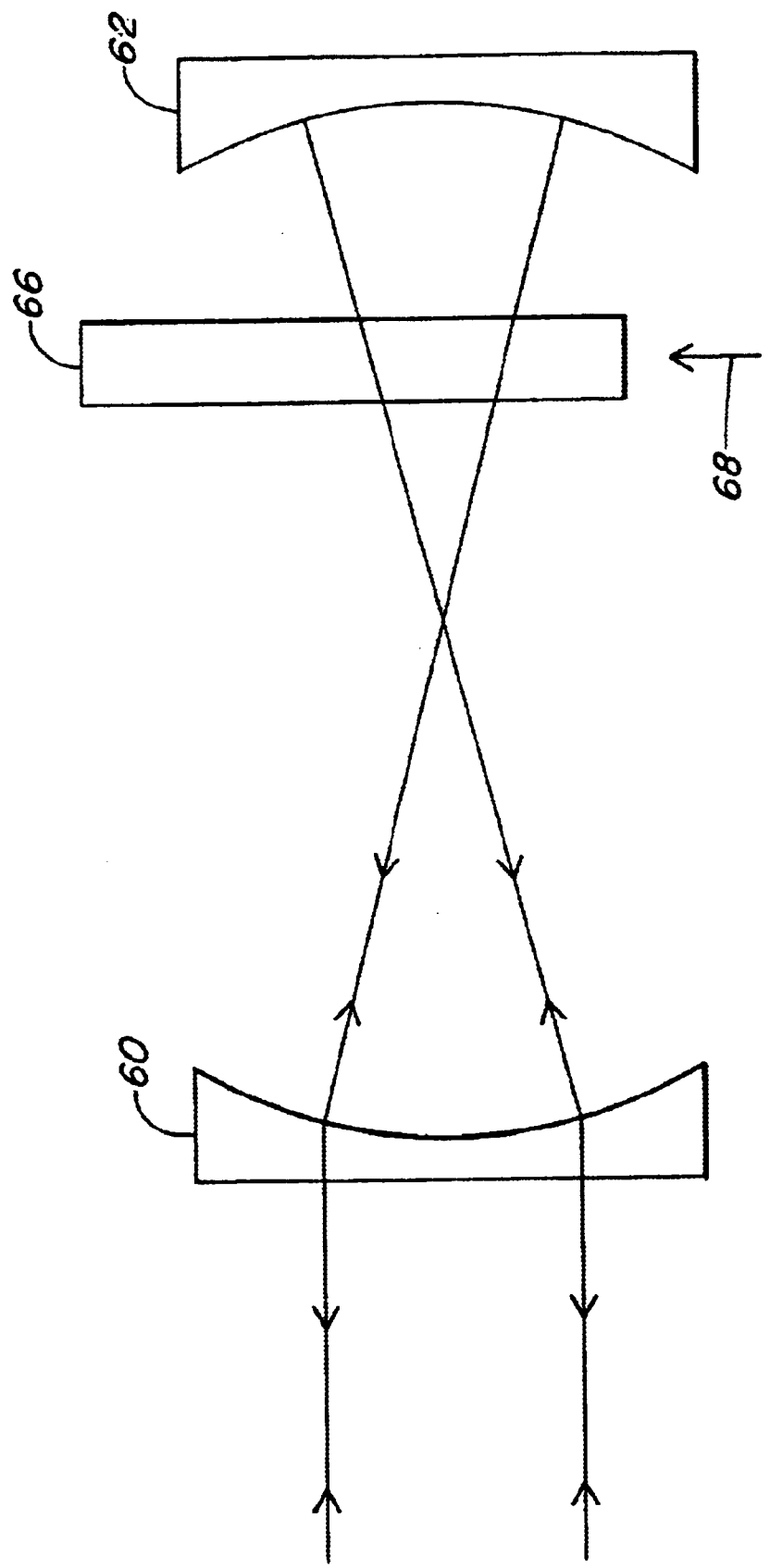

As shown in FIG. 5, a system in accordance with a further embodiment of the invention includes a partially reflecting mirror 60 and a perfectly reflecting mirror 62, each of which has a focal distance of $f$, and the optical path within the resonator is defined as $2f$. Similar to the embodiment discussed above with reference to FIG. 2, incident light from a planar light field (as indicated at 64) enters the resonator, passes through the hologram 66, and is reflected by the perfectly reflecting mirror 62. The hologram may be formed in any direction as dictated by the physical arrangement of the reference and object fields when the hologram was originally recorded. The hologram 66 may comprise a multiplexed holographic recording, permitting many different reconstructions to be produced from the same holographic material by moving the hologram in a direction that is transverse to the length of the resonator as shown at 68 in FIG. 6. In this fashion, a large number of separate images may be recorded in a single multiplexed recording, and viewed independent of one another by adjusting the position of the hologram with respect to the resonator.

The invention provides a system and method of improving the diffraction efficiencies of holograms to a theoretical maximum of up to 100% without violating either the Born or paraxial approximations. Holographic resonators in accordance with certain embodiments of the invention may be particularly suitable for applications in optical science, including optical networking, optical storage, and optical imaging. In further embodiments, any diffractive element may be used instead of a hologram. In still further embodiments, a perfectly reflecting mirror in any of the illustrated embodiments may be replaced with a partially reflecting mirror to provide additional output ports, and/or may further include additional mirrors to provide a plurality of resonant cavities.

Those skilled in the art will appreciate that numerous modifications and variations may be made to the above disclosed embodiments without departing from the spirit and scope of the invention.

What is claimed is:

1. A resonator system for use in illuminating the input to a diffractive element, said resonator system comprising:
   a source of an electromagnetic field having a wavelength of $\lambda$;
   a first optical element that is at least partially reflecting; and
   a second optical element that is at least partially reflecting, said first and second optical elements being separated from one another such that the optical path between said optical elements has a distance $$(2m+1)\frac{\lambda}{4},$$

wherein m is an integer;

said system further includes a diffractive element that is positioned between said first and second optical elements.

2. The resonator system as claimed in claim 1 wherein said diffractive element comprises a hologram.

3. The resonator system as claimed in claim 1, wherein said second optical element includes a perfectly reflecting mirror.

4. The resonator system as claimed in claim 1, wherein said first optical element includes a partially reflecting mirror having an amplitude reflectivity of r.

5. The resonator system as claimed in claim 4, wherein a holographic recording having an efficiency of $\eta$ is positioned between said first and second optical elements.

6. The resonator system as claimed in claim 5, wherein $r=\sqrt{1-\eta-b}$ where b is the absorption of the resonator system.

7. The resonator system as claimed in claim 1, wherein said first and second optical elements each include focusing optics for focusing said illumination field at a focal distance $f$, and wherein said optical path has a distance of $2f$.

8. A resonator system for use in viewing a hologram, said resonator system comprising:
   a source of an electromagnetic field having a wavelength of $\lambda$;
   a first mirror that is at least partially reflecting and has a reflectivity r;
   a holographic recording having an efficiency of $\eta$; and
   a second mirror that is at least partially reflecting, said first and second mirrors being separated from one another such that the optical path between said optical elements has a distance of $$(2n+1)\frac{\lambda}{4},$$

wherein m is an integer, and wherein said first and second mirrors define a resonator assembly having an absorption b such that $r=1-\eta-b$.

9. A resonator system as claimed in claim 8, wherein said holographic recording includes a volume hologram.

10. A resonator system as claimed in claim 8, wherein said second mirror is perfectly reflecting.

11. The resonator system as claimed in claim 8, wherein said first and second mirrors each include focusing optics for focusing said illumination field at a focal distance $f$, and wherein said optical path has a distance of $2f$.

12. A resonator system for illuminating a volume hologram, said resonator system comprising:
    a light source for producing an illumination field;
    a hologram on which is recorded a holographic recording said holographic recording having an efficiency $\eta$, and for producing a holographic image when said hologram is illuminated by said illumination field from a first direction and at an angle $\alpha$ with respect to said hologram;
    a first mirror that is at least partially reflective, said first mirror having a reflectivity r and being positioned between said light source and said hologram; and
    a second mirror that is at least partially reflective, said second mirror being separated from said first mirror such that said hologram is positioned between said first and second mirrors, wherein said first and second mirrors define a resonator assembly having an absorption b such that $r=1-\eta-b$, and wherein said first and second mirrors are positioned such that illumination that is reflected from said first mirror contacts said hologram from said first direction and at said angle α.

13. A resonator system for illuminating a diffractive element, said resonator system comprising:

illumination means for illuminating the diffractive element with an illumination field having a wavelength λ from a first direction and at an angle α with respect to said diffractive element to produce a diffractive image; and resonator means for causing said illumination field to be reflected back toward the diffractive element from said first direction and at said angle α so that the diffractive element is again illuminated by the illumination field, said resonator means providing an optical path having a distance of $$(2m+1)\frac{\lambda}{4},$$

where m is an integer.

14. A resonator system for use in viewing a hologram, said resonator system comprising:

an input port through which an illumination field enters said resonator;

a target area in which a holographic recording having an efficiency η is placed for producing a holographic image when said hologram is illuminated by said illumination field from a first direction and at an angle α with respect to said hologram;

a first mirror that is at least partially reflecting, said first mirror having a reflectivity r and being positioned between said input port and said target area; and a second mirror that is at least partially reflecting, said first and second mirrors being separated from one another such that the optical path between said first and second mirrors extends through said target area, wherein said first and second mirrors define a resonator assembly having an absorption b such that $r=\sqrt{1-\eta-b}$, and wherein said first and second mirrors are positioned such that illumination that is reflected from said first mirror contacts said hologram from said first direction and at said angle α.

15. A resonator system as claimed in claim 14, wherein said system further includes an output port through which a diffracted illumination field is produced.

16. A resonator system as claimed in claim 14, wherein said first and second mirrors each include focusing optics for focusing an illumination field at a focal distance $f$, and wherein said optical path has a distance of $2f$.

17. A method of illuminating a diffractive element, said method comprising the steps of:

producing an electromagnetic field having a wavelength of λ;

illuminating a diffractive element having an efficiency η with the electromagnetic field from a first direction and at an angle α with respect to said diffractive element to produce a diffracted field;

reflecting at least a portion of said electromagnetic field back toward the diffractive element using a mirror having a reflectivity r and a resonator assembly having an absorption b such that r–1–η–b;

illuminating the diffractive element with the reflected electromagnetic field from said first direction and at said angle α with respect to said diffractive element to produce a diffractive field.

18. A method as claimed in claim 17, wherein said method further includes the step of positioning the diffractive element between first and second mirrors, each of which is at least partially reflecting.

* * * * *